(No Model.)
A. VOLKENRATH.
PAN LIFTER.
No. 536,003. Patented Mar. 19, 1895.
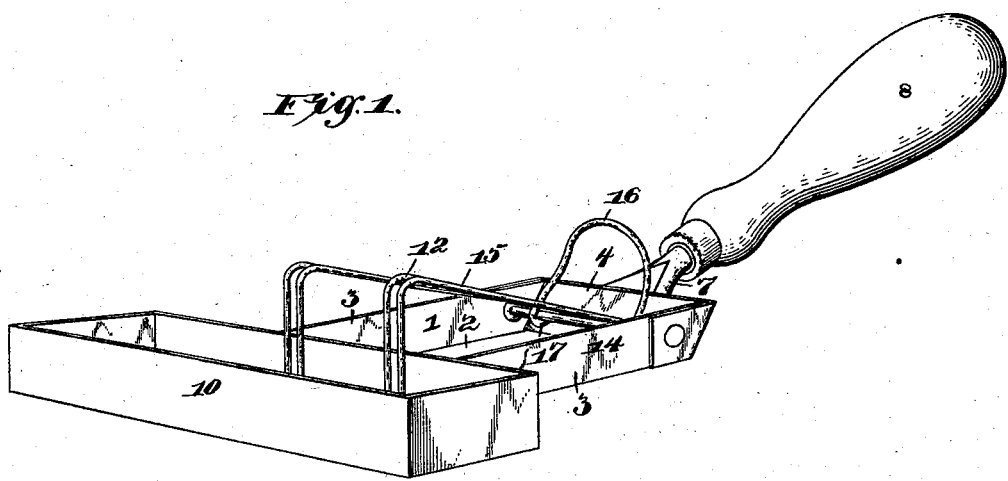
Inventor
August Volkenrath.
Witnesses
Wm. F. Doyle
H. F. Riley
By his Attorneys.
C. A. Snow & Co.

UNITED STATES PATENT OFFICE.

AUGUST VOLKENRATH, OF HUNTINGTON, WEST VIRGINIA.

PAN-LIFTER.

SPECIFICATION forming part of Letters Patent No. 536,003, dated March 19, 1895.

Application filed May 4, 1894. Serial No. 510,095. (No model.)

*To all whom it may concern:*

Be it known that I, AUGUST VOLKENRATH, a citizen of the United States, residing at Huntington, in the county of Cabell and State of West Virginia, have invented a new and useful Pan-Lifter, of which the following is a specification.

The invention relates to improvements in pan-lifters.

The object of the present invention is to improve the construction of pan-lifters, and to provide a simple and inexpensive device, adapted for readily lifting cooking utensils, ash-pans, and the like, without liability of accidentally upsetting them or spilling their contents.

The invention consists in the construction and novel combination and arrangement of parts hereinafter fully described, illustrated in the accompanying drawings, and pointed out in the claim hereto appended.

In the drawings: Figure 1 is a perspective view of a pan-lifter constructed in accordance with this invention. Fig. 2 is a longitudinal sectional view, showing the lifter in engagement with a pan. Fig. 3 is a plan view.

Like numerals of reference indicate corresponding parts in all the figures of the drawings.

1 designates a box composed of a bottom 2, sides 3, and a back 4, and provided at its front with a flat shovel extension 5 forming a continuation of the bottom of the box. The shovel extension is tapering, having oppositely beveled front edges 6 to adapt it to be readily inserted under a pan; and it projects laterally beyond the sides of the box. The back 4 of the box is inclined, and has secured to it a shank 7 of a handle 8; and the said shank is flattened and extends forward on the lower face of the bottom 2 of the box. The front edges 9 of the sides 3 form shoulders, adapted to abut against a side of a pan, and in order to retain the pan 10 on the shovel extension, which is slightly beveled at 11 to facilitate insertion beneath the pan, a swinging catch 12 is mounted on the box. The sides of the box are connected by cross-rods 13 and 14, and the latter forms a pintle for the swinging catch, which is composed of approximately L-shaped sides 15 and a thumb loop 16 arranged at the inner ends of the sides between the same, and adapted to be depressed by the thumb to lift the sides of the swinging catch. It will be seen that the thumb loop is arranged at the inner end of the handle in convenient position to be operated by the thumb of the hand grasping the handle.

The swinging catch is preferably constructed of a single piece of wire, which is doubled to form the thumb loop, coiled to form eyes 17 at opposite sides of the loop, and then doubled and bent at each side of the thumb loop to form the approximately L-shaped sides 15. The terminals of the wire are bent to form eyes.

The pan-lifter is adapted for lifting all kinds of cooking utensils having vertical or approximately vertical sides of not too great a height, ash-pans, and the like; and it will be seen that the shovel extension of the box forms a broad supporting base for the pan, and that the latter is securely retained on the shovel extension by the swinging catch. It will also be apparent that the upwardly swinging catch has its thumb loop located at the inner end of the handle, in order to be in convenient position, to be engaged by the thumb of the hand grasping the handle.

Changes in the form, proportion, and the minor details of construction may be resorted to without departing from the principle or sacrificing any of the advantages of this invention.

What I claim is—

A pan-lifter, comprising a box provided at its front with a shovel extension, a handle arranged at the back of the box, a transverse pintle mounted on the box, and an upwardly swinging catch constructed of a single piece of wire and consisting of the doubled approximately L-shaped sides provided at their inner terminals with eyes receiving the pintle and the intermediate finger loop arranged at the inner end of the handle and located between the sides, substantially as described.

In testimony that I claim the foregoing as my own I have hereto affixed my signature in the presence of two witnesses.

AUGUST VOLKENRATH.

Witnesses:
R. L. HUTCHINSON,
A. E. SALMON.